US012679709B2

(12) United States Patent
Kakita

(10) Patent No.: US 12,679,709 B2
(45) Date of Patent: Jul. 14, 2026

(54) CARGO HANDLING CONTROL DEVICE OF FORKLIFT TRUCK

(71) Applicant: KABUSHIKI KAISHA TOYOTA JIDOSHOKKI, Kariya (JP)

(72) Inventor: Yoshiki Kakita, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 17 days.

(21) Appl. No.: 19/011,832

(22) Filed: Jan. 7, 2025

(65) Prior Publication Data

US 2025/0223147 A1 Jul. 10, 2025

(30) Foreign Application Priority Data

Jan. 9, 2024 (JP) ................................ 2024-001289

(51) Int. Cl.
*B66F 17/00* (2006.01)
*B66F 9/12* (2006.01)
*B66F 9/22* (2006.01)

(52) U.S. Cl.
CPC ............ *B66F 17/003* (2013.01); *B66F 9/125* (2013.01); *B66F 9/22* (2013.01)

(58) Field of Classification Search
None
See application file for complete search history.

(56) References Cited

U.S. PATENT DOCUMENTS

2020/0369498 A1* 11/2020 Ekshinge ................ B66F 9/122
2023/0242386 A1 8/2023 Kato et al.
2024/0239637 A1* 7/2024 Kato ..................... B66F 9/0755
2025/0223144 A1* 7/2025 Kakita .................. B66F 9/0755
2025/0223147 A1* 7/2025 Kakita .................. B66F 17/003

FOREIGN PATENT DOCUMENTS

JP 2023-110711 A 8/2023

* cited by examiner

*Primary Examiner* — Peter D Nolan
*Assistant Examiner* — Jacob Kent Besteman-Street
(74) *Attorney, Agent, or Firm* — Sughrue Mion, PLLC

(57) ABSTRACT

A cargo handling control device includes: a fork lowering controller for controlling so that a fork holding a pallet is lowered toward a loading surface; a pallet posture determination unit configured to determine a posture of the pallet relative to the fork; a pallet placement controller for controlling so that the fork is placed on the loading surface depending on the posture of the pallet; and a fork withdrawal controller for controlling so that the fork is pulled out of the pallet. The pallet placement controller judges based on the posture of the pallet whether the fork is allowed to be pulled out of the pallet. When the fork is allowed to be pulled out of the pallet, the fork stops being lowered. When the fork is not allowed to be pulled out of the pallet, the fork tilts along the loading surface.

5 Claims, 13 Drawing Sheets

FIG. 5

| UPPER SENSOR (PALLET UPPER WALL DETECTION) | LOWER SENSOR (PALLET LOWER WALL DETECTION) | PALLET SENSOR | |
|---|---|---|---|
| | | ON | OFF |
| ON | OFF | FORK LOWERING | FORK FORWARD TILT REQUIRED |
| OFF | ON | FORK BACKWARD TILT REQUIRED | FORK PULL-OUT ALLOWED |
| OFF | OFF | FORK LOWERING | FORK PULL-OUT ALLOWED |
| ON | ON | FORK IMMEDIATE STOP REQUIRED | FORK IMMEDIATE STOP REQUIRED |

CARGO HANDLING CONTROL DEVICE OF FORKLIFT TRUCK

CROSS-REFERENCE TO RELATED APPLICATION

This application claims priority to Japanese Patent Application No. 2024-001289 filed on Jan. 9, 2024, the entire disclosure of which is incorporated herein by reference.

The present disclosure relates to a cargo handling control device of a forklift truck.

BACKGROUND ART

A known cargo handling control device of a forklift truck is mentioned in Japanese Patent Application Publication No. 2023-110711. This known cargo handling control device includes a detection sensor that is disposed at a proximal portion of an insertion part of a fork and configured to detect contact between the fork and the first upper surface of a pallet that faces the fork, and a controller that is configured to control a cargo handling device so that the cargo handling device lowers the fork to place the pallet on a loading surface and then pulls the fork out of the pallet. When the detection sensor detects that the fork has moved away from the first upper surface while the cargo handling device is lowering the fork, the controller stops the fork and controls so that the fork tilts forward until a tilt angle of the fork reaches a limit value. If the tilt angle of the fork no longer change before reaching the limit value, the controller controls so that the fork tilts backward.

According to the known cargo handling control device, the fork tilts forward and then tilt backward to load the pallet on the loading surface, even when the pallet is not tilted. It may take time to place the pallet.

The present disclosure is directed to providing a cargo handling control device of a forklift truck capable of reducing time to place a pallet.

SUMMARY

In accordance with an aspect of the present disclosure, there is provided a cargo handling control device of a forklift truck. The forklift truck includes a lift cylinder configured to raise and lower a fork holding a pallet and a tilt cylinder configured to tilt the fork. The cargo handling control device includes: a first detector; a second detector; a third detector; a fork lowering controller; a pallet posture determination unit; a pallet placement controller; and a fork withdrawal controller. The first detector is configured to detect whether a distal portion of the fork inserted into a pallet hole of the pallet is adjacent to an upper wall of the pallet. The first detector is configured to output a detection signal. The second detector is configured to detect whether the distal portion of the fork inserted into the pallet hole of the pallet is adjacent to a lower wall of the pallet. The second detector is configured to output a detection signal. The third detector is configured to detect whether a proximal portion of the fork inserted into the pallet hole of the pallet is in contact with the upper wall of the pallet. The third detector is configured to output a detection signal. The fork lowering controller is configured to control the lift cylinder so that the lift cylinder lowers the fork holding the pallet toward a loading surface. The pallet posture determination unit is configured to determine a posture of the pallet relative to the fork based on the detection signals from the first detector, the second detector, and the third detector, after the fork lowering controller starts controlling the lift cylinder. The pallet placement controller is configured to control the lift cylinder and the tilt cylinder so that the fork is placed on the loading surface depending on the posture of the pallet relative to the fork determined by the pallet posture determination unit. The fork withdrawal controller is configured to control the forklift truck so that the forklift truck pulls the fork out of the pallet after the pallet placement controller completes controlling the lift cylinder and the tilt cylinder. The pallet placement controller judges based on the posture of the pallet whether the fork is allowed to be pulled out of the pallet. When the pallet placement controller judges that the fork is allowed to be pulled out of the pallet, the pallet placement controller controls the lift cylinder so that the lift cylinder stops lowering the fork. When the pallet placement controller judges that the fork is not allowed to be pulled out of the pallet, the pallet placement controller controls the tilt cylinder so that tilt cylinder tilts the fork along the loading surface.

Other aspects and advantages of the disclosure will become apparent from the following description, taken in conjunction with the accompanying drawings, illustrating by way of example the principles of the disclosure.

BRIEF DESCRIPTION OF DRAWINGS

The disclosure, together with objects and advantages thereof, may best be understood by reference to the following description of the presently preferred embodiments together with the accompanying drawings in which:

FIG. 5 is a table illustrating the relationship between detection signals from an upper sensor, a lower sensor, and a pallet sensor, and a posture of the pallet relative to the fork;

DETAILED DESCRIPTION OF THE EMBODIMENT

The following will describe an embodiment of the present disclosure in detail with reference to the accompanying drawings.

Figure 1:
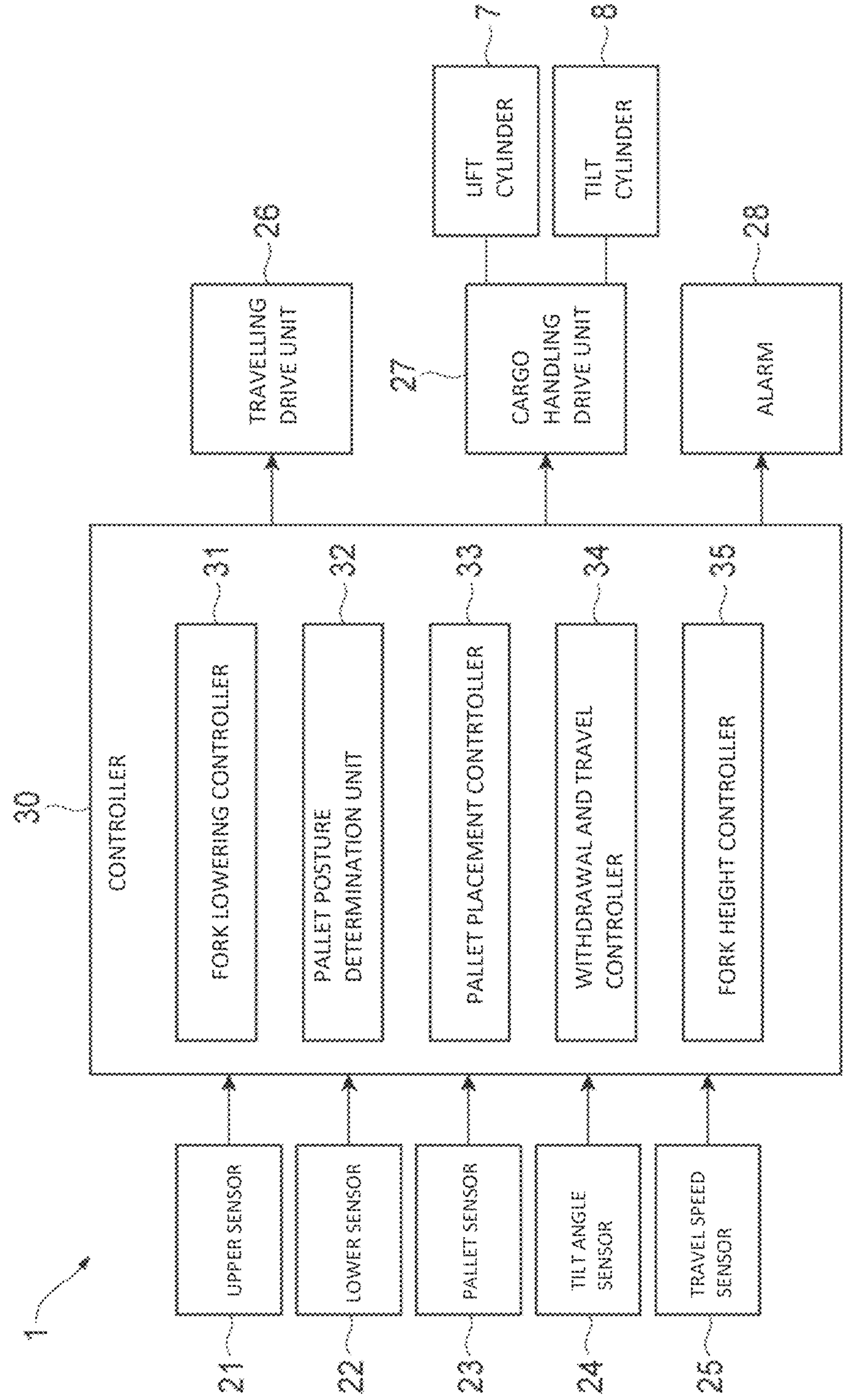
FIG. 1 is a block diagram of a cargo handling control device of a forklift truck according to an embodiment of the present disclosure.
Figure 2:
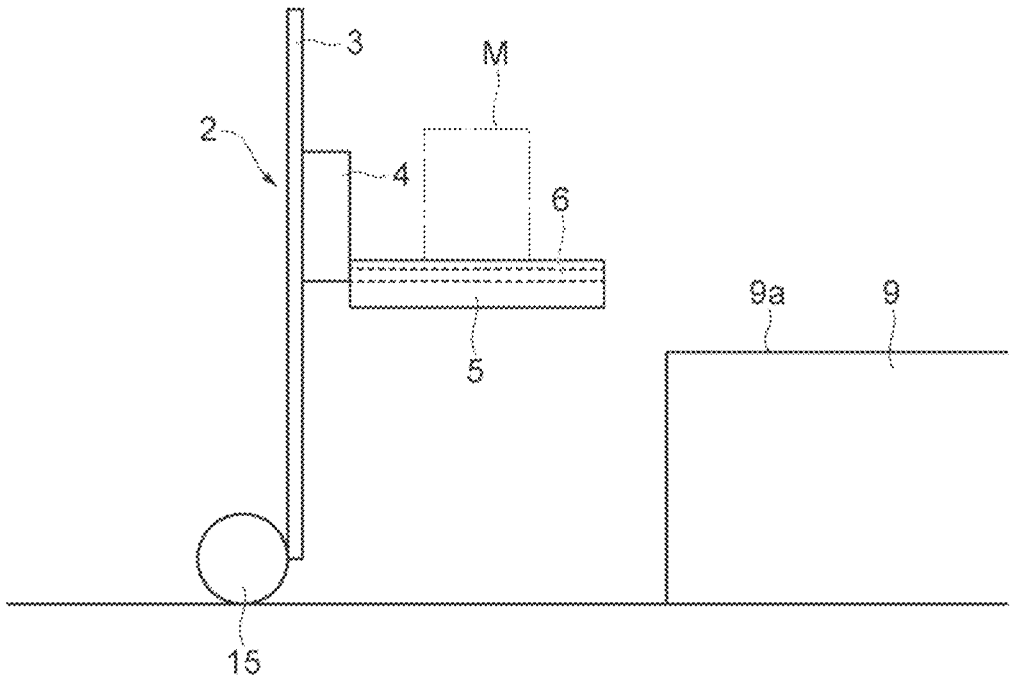
FIG. 2 is a schematic side view of a front part of the forklift truck and a loading platform, illustrating the forklift truck holding a pallet with a fork.

FIG. 1 is a block diagram of a cargo handling control device of a forklift truck according to an embodiment of the present disclosure. In FIG. 1, a cargo handling control device 1 according to a present embodiment is mounted on a forklift truck 2, such as a counterbalance forklift truck. As illustrated in FIG. 2, the forklift truck 2 includes a mast 3, and a right-left pair of forks 6 that is mounted to the mast 3 via a spacer 4 and movable up and down. The forks 6 hold a pallet 5.

The forklift truck 2 includes a lift cylinder 7 configured to raise or lower the forks 6, and a tilt cylinder 8 configured to tilt the forks 6 by tilting the mast 3 (see FIG. 1).

Figure 3:
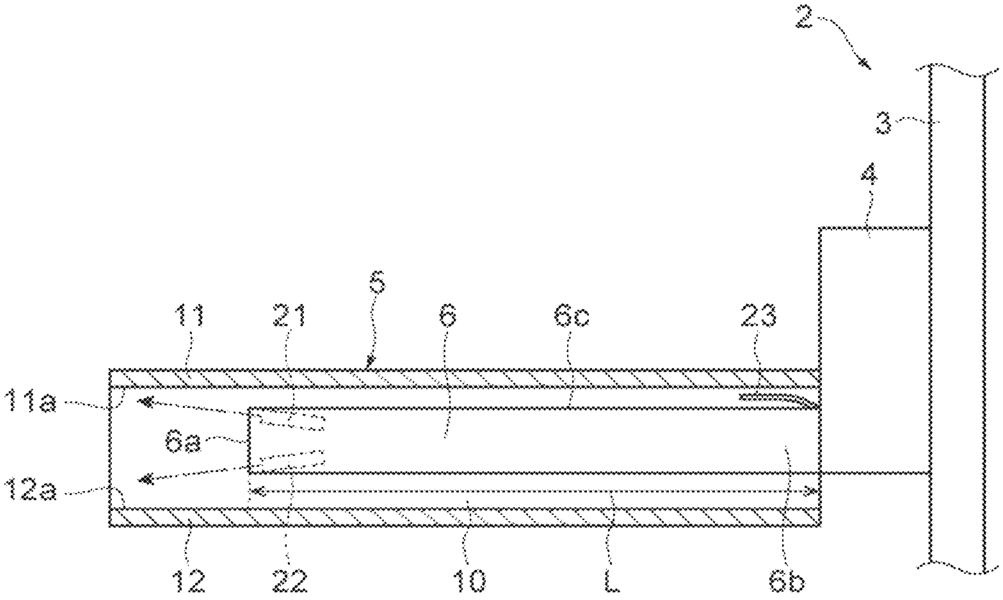
FIG. 3 is a cross-sectional view of the fork and the pallet, illustrating the fork inserted into a pallet hole of the pallet.

The pallet 5 is a bed on which a cargo M is placed. The pallet 5 is a flat pallet, for example. The pallet 5 has an approximately square shape in a plane view. The pallet 5 is placed on a loading surface 9*a* of a loading platform 9 of a truck or the like. As illustrated in FIG. 3, the pallet 5 has two pallet holes 10 into which the forks 6 are inserted, respectively. The pallet 5 has an upper wall 11 and a lower wall 12 that form the pallet holes 10. The upper wall 11 and the lower wall 12 respectively have an inner wall surface 11*a* and an inner wall surface 12*a* that face each other.

The cargo handling control device 1 is a device that controls the forklift truck 2 so that the forklift truck 2 automatedly places the pallet 5. The cargo handling device 1 controls the forklift truck 2 so that the forklift truck 2 places the pallet 5 held by the forks 6 on the loading surface 9*a* of the loading platform 9 and pulls the forks 6 out of the pallet 5.

The cargo handling control device 1 includes an upper sensor 21, a lower sensor 22, a pallet sensor 23, a tilt angle sensor 24, a vehicle speed sensor 25, a travelling drive unit 26, a cargo handling drive unit 27, an alarm 28, and a controller 30.

The upper sensor 21 and the lower sensor 22 are arranged vertically inside a distal portion 6*a* of each fork 6, as illustrated in FIG. 3. The upper sensor 21 and the lower sensor 22 may be reflective photoelectric sensors that irradiate one dimension light, for example. Alternatively, the upper sensor 21 and the lower sensor 22 may be proximity switches and the like.

The upper sensor 21 serves as the first detector of the present disclosure that detects whether the distal portion 6*a* of the fork 6 inserted into the pallet hole of the pallet 5 is adjacent to the upper wall 11 of the pallet 5. Specifically, the upper sensor 21 detects whether the distal portion 6*a* of the fork 6 inserted into the pallet hole 10 of the pallet 5 is adjacent to the upper wall 11 of the pallet 5 by detecting whether a distance from the distal portion 6*a* of the fork 6 to the upper wall 11 of the pallet 5 is equal to or less than a predetermined value. The predetermined value is, for example, on the order of several millimeters. The upper sensor 21 outputs an ON signal as a detection signal when the distal portion 6*a* of the fork 6 is adjacent to the upper wall 11 of the pallet 5. In this context, "the distal portion 6*a* of the fork 6 is adjacent to the upper wall 11 of the pallet 5" may include "the distal portion 6*a* of the fork 6 is in contact with the upper wall 11 of the pallet 5" depending on the predetermined value.

The lower sensor 22 serves as the second detector of the present disclosure that detects whether the distal portion 6*a* of the fork 6 inserted into the pallet hole 10 of the pallet 5 is adjacent to the lower wall 12 of the pallet 5. Specifically, the lower sensor 22 detects whether the distal portion 6*a* of the fork 6 inserted into the pallet hole 10 of the pallet 5 is adjacent to the lower wall 12 of the pallet 5 by detecting whether a distance from the distal portion 6*a* of the fork 6 to the lower wall 12 of the pallet 5 is equal to or less than a predetermined value.

The predetermined value is the same as that for the upper sensor 21. The lower sensor 22 outputs an ON signal as a detection signal when the distal portion 6*a* of the fork 6 is adjacent to the lower wall 12 of the pallet 5. In this context, "the distal portion 6*a* of the fork 6 is adjacent to the lower wall 12 of the pallet 5" may include "the distal portion 6*a* of the fork 6 is in contact with the lower wall 12 of the pallet 5" depending on the predetermined value.

The pallet sensor 23 is disposed at a proximal portion 6*b* of the fork 6, as illustrated in FIG. 3. The pallet sensor 23 may be a limit switch, for example. The pallet sensor 23 is mounted on an upper surface 6*c* of the fork 6. The pallet sensor 23 serves as the third detector of the present disclosure that detects whether the proximal portion 6*b* of the fork 6 inserted into the pallet hole 10 of the pallet 5 is in contact with the upper wall 11 of the pallet 5. The pallet sensor 23 outputs an ON signal as a detection signal when the proximal portion 6*b* of the fork 6 comes into contact with the upper wall 11 of the pallet 5.

The tilt angle sensor 24 is a sensor that detects a tilt angle of the fork 6. The tilt angle sensor 24 is mounted on the spacer 4, for example. The vehicle speed sensor 25 detects a travel speed of the forklift truck 2.

The travelling drive unit 26 is configured to drive the forklift truck 2 to travel. The travelling drive unit 26 includes a traveling motor (not illustrated) for rotating a front wheel 15 (see FIG. 2) as a drive wheel and a steering motor (not illustrated) for steering a rear wheel (not illustrated) as a steered wheel, for example.

The cargo handling drive unit 27 is configured to operate the lift cylinder 7 and the tilt cylinder 8. The cargo handling drive unit 27 is, for example, an oil control valve (not illustrated), and disposed between a hydraulic pump and the lift cylinder 7 and the tilt cylinder 8.

The alarm 28 alerts in the vicinity of the forklift truck 2 through audible signals or visual indicators.

The controller 30 includes a central processing unit (CPU), a random access memory (RAM), a read-only memory (ROM), and input/output interfaces. The controller 30 includes a fork lowering controller 31, a pallet posture determination unit 32, a pallet placement controller 33, a withdrawal and travel controller 34, and a fork height controller 35.

The fork lowering controller 31 controls the lift cylinder 7 via the cargo handling drive unit 27 so that the fork 6 holding the pallet 5 is lowered toward the loading surface 9*a* of the loading platform 9.

The pallet posture determination unit 32 determines a posture of the pallet 5 relative to the fork 6 based on detection signals from the upper sensor 21, the lower sensor 22, and the pallet sensor 23 after the fork lowering controller 31 starts controlling the lift cylinder 7.

When the upper sensor 21 detects that the distal portion 6*a* of the fork 6 is not adjacent to the upper wall 11 of the pallet 5 and the pallet sensor 23 detects that the proximal portion 6*b* of the fork 6 is not in contact with the upper wall 11 of the pallet 5, the pallet posture determination unit 32 determines that the posture of the pallet 5 allows the fork 6 to be pulled out of the pallet 5.

When the upper sensor 21 detects that the distal portion 6*a* of the fork 6 is adjacent to the upper wall 11 of the pallet 5, the lower sensor 22 detects that the distal portion 6*a* of the fork 6 is not adjacent to the lower wall 12 of the pallet 5, and the pallet sensor 23 detects that the proximal portion 6*b* of the fork 6 is not in contact with the upper wall 11 of the pallet 5, the pallet posture determination unit 32 determines that the posture of the pallet 5 is a posture that requires the fork 6 to tilt forward (downward).

When the upper sensor 21 detects that the distal portion 6*a* of the fork 6 is not adjacent to the upper wall 11 of the pallet 5, the lower sensor 22 detects that the distal portion 6*a* of the fork 6 is adjacent to the lower wall 12 of the pallet 5, and the pallet sensor 23 detects that the proximal portion 6*b* of the fork 6 is in contact with the upper wall 11 of the pallet 5, the pallet posture determination unit 32 determines that the posture of the pallet 5 is a posture that requires the fork 6 to tilt backward (upward).

When the upper sensor 21 detects that the distal portion 6*a* of the fork 6 is adjacent to the upper wall 11 of the pallet 5 and the lower sensor 22 detects that the distal portion 6*a* of the fork 6 is adjacent to the lower wall 12 of the pallet 5, the pallet posture determination unit 32 determines that the posture of the pallet 5 is a posture that requires the fork 6 to immediately stop.

The pallet placement controller 33 controls the lift cylinder 7 and the tilt cylinder 8 via the cargo handling drive unit 27 so that the fork 6 is placed on the loading surface 9*a* of the loading platform 9 depending on the posture of the pallet 5 relative to the fork 6 determined by the pallet posture determination unit 32.

The pallet placement controller 33 judges based on the posture of the pallet 5 relative to the fork 6 whether the fork 6 is allowed to be pulled out of the pallet 5. When the pallet placement controller 33 judges that the fork 6 is allowed to be pulled out of the pallet 5, the pallet placement controller 33 controls the lift cylinder 7 via the cargo handling drive unit 27 so that the lift cylinder 7 stops lowering the fork 6. When the pallet placement controller 33 judges that the fork 6 is not allowed to be pulled out of the pallet 5, the pallet placement controller 33 controls the tilt cylinder 8 via the cargo handling drive unit 27 so that tilt cylinder 8 tilts the fork 6 along the loading surface 9*a* of the loading platform 9.

Specifically, when the pallet posture determination unit 32 determines that the posture of the pallet 5 allows the fork 6 to be pulled out of the pallet 5, the pallet placement controller 33 controls the lift cylinder 7 via the cargo handling drive unit 27 so that the lift cylinder 7 stops lowering the fork 6.

When the pallet posture determination unit 32 determines that the posture of the pallet 5 requires the fork 6 to tilt forward, the pallet placement controller 33 controls the tilt cylinder 8 via the cargo handling drive unit 27 so that the tilt cylinder 8 tilts the fork 6 forward along the loading surface 9*a* of the loading platform 9. When the pallet posture determination unit 32 determines that the posture of the pallet 5 requires the fork 6 to tilt backward, the pallet placement controller 33 controls the tilt cylinder 8 via the cargo handling drive unit 27 so that the tilt cylinder 8 tilts the fork 6 backward along the loading surface 9*a* of the loading platform 9.

More specifically, when the pallet posture determination unit 32 determines that the posture of the pallet 5 requires the fork 6 to tilt forward, the pallet placement controller 33 controls the tilt cylinder 8 via the cargo handling drive unit 27 so that the tilt cylinder 8 tilts the fork 6 forward incrementally by a certain amount until the pallet posture determination unit 32 determines that the posture of the pallet 5 does not require the fork 6 to tilt forward. When the pallet posture determination unit 32 determines that the posture of the pallet 5 requires the fork 6 to tilt backward, the pallet placement controller 33 controls the tilt cylinder 8 via the cargo handling drive unit 27 so that the tilt cylinder 8 tilts the fork 6 backward incrementally by a certain amount until the pallet posture determination unit 32 determines that the posture of the pallet 5 does not require the fork 6 to tilt backward.

When the pallet posture determination unit 32 determines that the posture of the pallet 5 requires the fork 6 to immediately stop, the pallet placement controller 33 controls the travelling drive unit 26 and the cargo handling drive unit 27 of the forklift truck 2 so that the operation of the forklift truck 2 stops.

The withdrawal and travel controller 34 controls the travelling drive unit 26 so that the forklift truck 2 travels backward to pull the fork 6 out of the pallet 5 after the pallet placement controller 33 completes controlling the lift cylinder 7 and the tilt cylinder 8.

The fork height controller 35 controls the lift cylinder 7 via the cargo handling drive unit 27 so that the fork 6 remains at a constant height while the forklift truck 2 travels backward.

Specifically, when the fork 6 is tilted forward, the fork height controller 35 controls the lift cylinder 7 via the cargo handling drive unit 27 so that the fork 6 is raised while the forklift truck 2 travels backward. When the fork 6 is tilted backward, the fork height controller 35 controls the lift cylinder 7 via the cargo handling drive unit 27 so that the fork 6 is lowered while the forklift truck 2 travels backward.

The withdrawal and travel controller 34 and the fork height controller 35 cooperate to serve as the fork withdrawal controller of the present disclosure that controls the forklift truck 2 so that the forklift truck 2 pulls the fork 6 out of the pallet after the pallet placement controller 33 completes controlling the lift cylinder 7 and the tilt cylinder 8.

Figure 4:
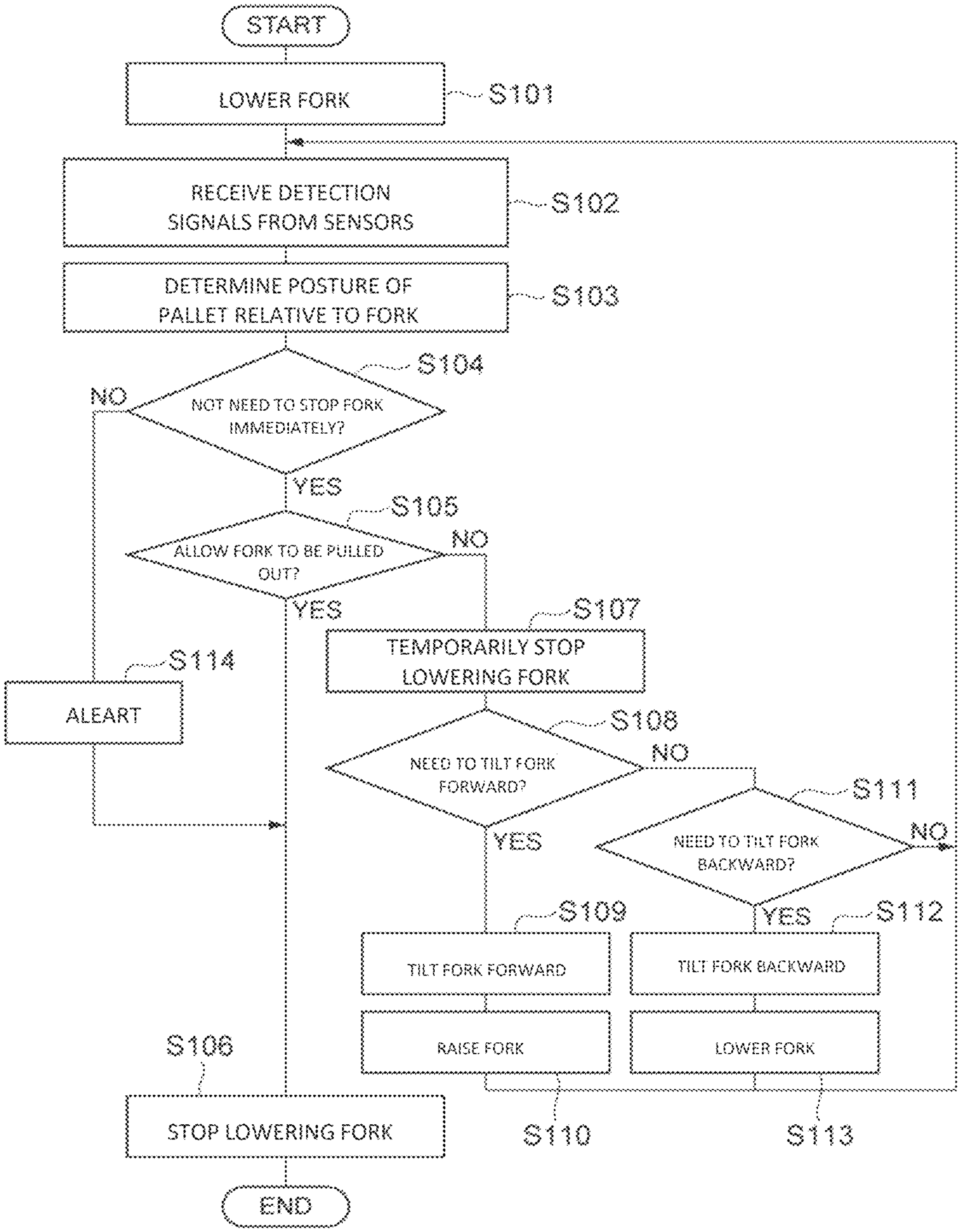
FIG. 4 is a flowchart of a pallet placement control process executed by a controller illustrated in FIG. 1.

FIG. 4 is a flowchart of a pallet placement control process executed by the controller 30. This process is executed by the fork lowering controller 31, the pallet posture determination unit 32, and the pallet placement controller 33 when a placement operation is instructed while the pallet 5 is held by the fork 6.

Figure 11A:
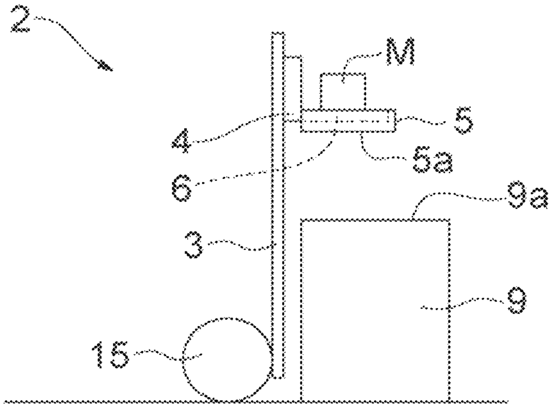
FIGS. 11A to 11C are side views of the forklift truck and the pallet, illustrating operations of the forklift truck for placing the pallet on a horizontal loading surface and pulling the fork out of the pallet.

At the start of this process, the pallet 5 held by fork 6 is positioned directly above the loading surface 9*a* of the loading platform 9 (see accompanied figures, such as FIG. 11A). When the pallet 5 is normally held by the fork 6, the distal portion 6*a* and the proximal portion 6*b* of the fork 6 are in contact with the inner wall surface 11*a* of the upper wall 11 of the pallet 5, but the distal portion 6*a* of the fork 6 is not in contact with the inner wall surface 12*a* of the lower wall 12 of the pallet 5.

In FIG. 4, the controller 30 first controls the cargo handling drive unit 27 so that the fork 6 is lowered toward the loading surface 9*a* of the loading platform 9 (step S101). The controller 30 then receives the detection signals from the upper sensor 21, the lower sensor 22, and the pallet sensor 23 (step S102).

The controller 30 determines a posture of the pallet 5 relative to the fork 6 based on the detection signals from the upper sensor 21, the lower sensor 22, and the pallet sensor 23 (step S103).

FIG. 5 is a table illustrating the relationship between the detection signals from the upper sensor 21, the lower sensor 22, and the pallet sensor 23, and the posture of the pallet 5 relative to the fork 6.

Figure 6A:
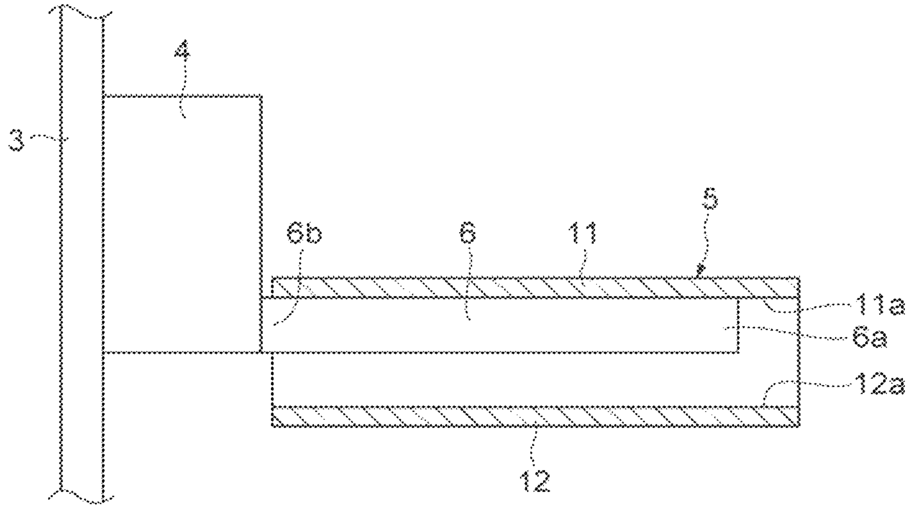
FIG. 6A is a cross-sectional view of the pallet in a posture when the pallet is being lowered by the fork shown in FIG. 5.

When the upper sensor 21, the lower sensor 22, and the pallet sensor 23 respectively output ON signal, OFF signal, and ON signal (see FIG. 5), the distal portion 6*a* of the fork 6 is adjacent to the inner wall surface 11*a* of the upper wall 11 of the pallet 5, the distal portion 6*a* of the fork 6 is not adjacent to the inner wall surface 12*a* of the lower wall 12 of the pallet 5, and the proximal portion 6*b* of the fork 6 is in contact with the inner wall surface 11*a* of the upper wall 11 of the pallet 5, as illustrated in FIG. 6A. In this state, the pallet 5 is being lowered by the fork 6.

Figure 6B:
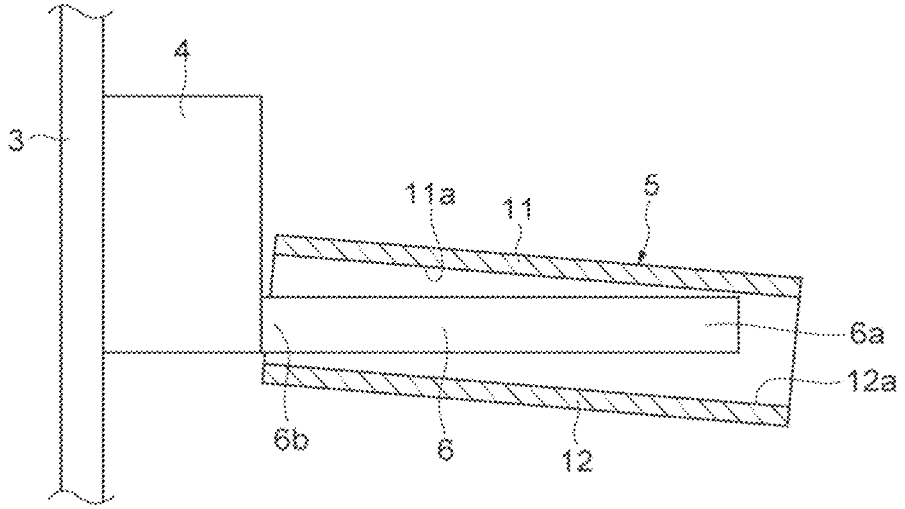
FIG. 6B is a cross-sectional view of the pallet in a posture that requires the fork to tilt forward shown in FIG. 5.

When the upper sensor 21, the lower sensor 22, and the pallet sensor 23 respectively output ON signal, OFF signal, and OFF signal, the distal portion 6*a* of the fork 6 is adjacent to the inner wall surface 11*a* of the upper wall 11 of the pallet 5, the distal portion 6*a* of the fork 6 is not adjacent to the inner wall surface 12*a* of the lower wall 12 of the pallet 5, and the proximal portion 6*b* of the fork 6 is not in contact with the inner wall surface 11*a* of the upper wall 11 of the pallet 5, as illustrated in FIG. 6B. In this state, the pallet 5 is tilted downward from the proximal portion 6*b* to the distal portion 6*a* such that a part of the pallet 5 near the proximal portion 6*b* is positioned higher than a part of the pallet 5 near the distal portion 6*a*. Accordingly, the posture of the pallet 5 is a posture that requires the fork 6 to tilt forward.

Figure 7A:
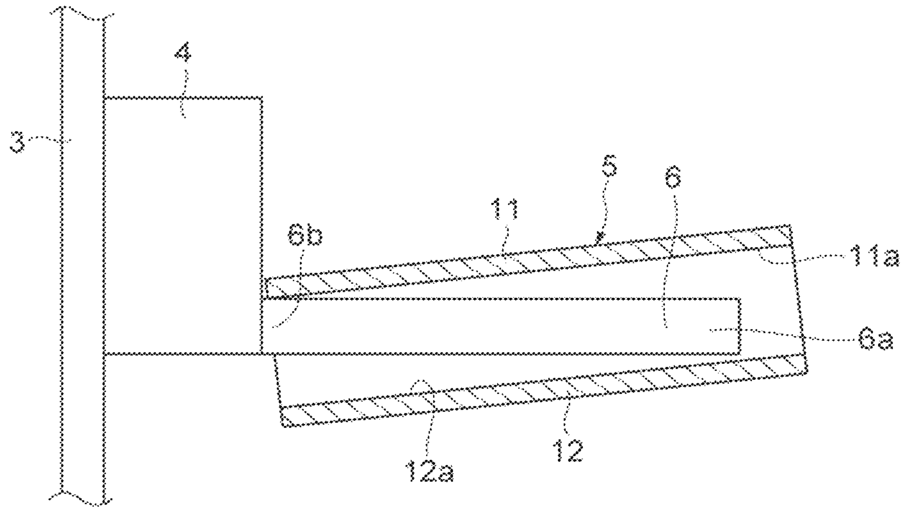
FIG. 7A is a cross-sectional view of the pallet in a posture that requires the fork to tilt backward shown in FIG. 5.

When the upper sensor 21, the lower sensor 22, and the pallet sensor 23 respectively output OFF signal, ON signal, and ON signal, the distal portion 6*a* of the fork 6 is not adjacent to the inner wall surface 11*a* of the upper wall 11 of the pallet 5, the distal portion 6*a* of the fork 6 is adjacent to the inner wall surface 12*a* of the lower wall 12 of the pallet 5, and the proximal portion 6*b* of the fork 6 is in contact with the inner wall surface 11*a* of the upper wall 11 of the pallet 5, as illustrated in FIG. 7A. In this state, the pallet 5 is tilted upward from the proximal portion 6*b* to the distal portion 6*a* such that a part of the pallet 5 near the proximal portion 6*b* is positioned lower than a part of the pallet 5 near the distal portion 6*a*. Accordingly, the posture of the pallet 5 is a posture that requires the fork 6 to tilt backward.

Figure 7B:
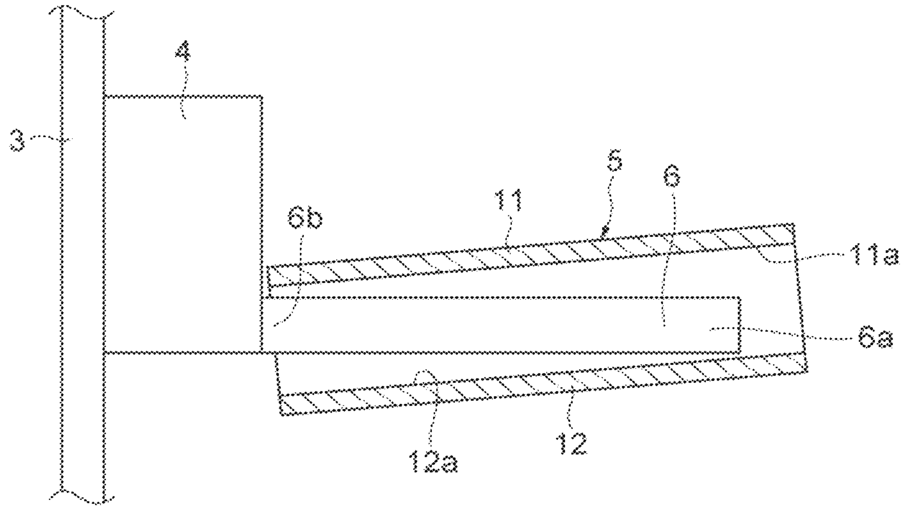
FIG. 7B is a cross-sectional view of the pallet in a posture that allows the fork to be pulled out of the pallet shown in FIG. 5.

When the upper sensor 21, the lower sensor 22, and the pallet sensor 23 respectively output OFF signal, ON signal, and OFF signal, the distal portion 6*a* of the fork 6 is not adjacent to the inner wall surface 11*a* of the upper wall 11 of the pallet 5, the distal portion 6*a* of the fork 6 is adjacent to the inner wall surface 12*a* of the lower wall 12 of the pallet 5, and the proximal portion 6*b* of the fork 6 is not in contact with the inner wall surface 11*a* of the upper wall 11 of the pallet 5, as illustrated in FIG. 7B. In this state, the posture of the pallet 5 allows the fork 6 to be pulled out of the pallet 5, even when the pallet 5 is tilted upward from the proximal portion 6*b* to the distal portion 6*a* such that a part of the pallet 5 near the proximal portion 6*b* is positioned lower than a part of the pallet 5 near the distal portion 6*a*.

Figure 8A:
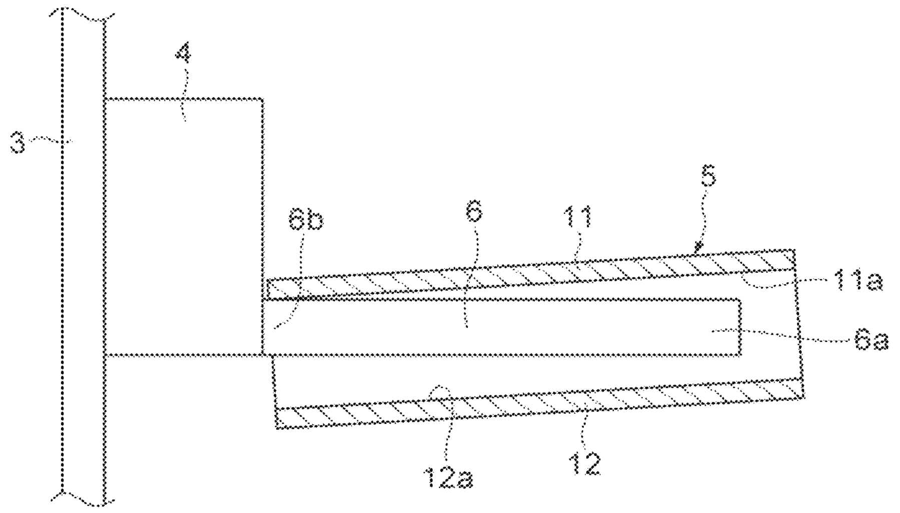
FIG. 8A is a cross-sectional view of the pallet in a posture when the pallet is being lowered by the fork shown in FIG. 5.

When the upper sensor 21, the lower sensor 22, and the pallet sensor 23 respectively output OFF signal, OFF signal, and ON signal, the distal portion 6*a* of the fork 6 is not adjacent to the inner wall surface 11*a* of the upper wall 11 of the pallet 5, the distal portion 6*a* of the fork 6 is not adjacent to the inner wall surface 12*a* of the lower wall 12 of the pallet 5, and the proximal portion 6*b* of the fork 6 is in contact with the inner wall surface 11*a* of the upper wall 11 of the pallet 5, as illustrated in FIG. 8A. In this state, the pallet 5 is being lowered by the fork 6, even when the pallet 5 is tilted upward from the proximal portion 6*b* to the distal portion 6*a* such that a part of the pallet 5 near the proximal portion 6*b* is positioned lower than a part of the pallet 5 near the distal portion 6*a*.

Figure 8B:
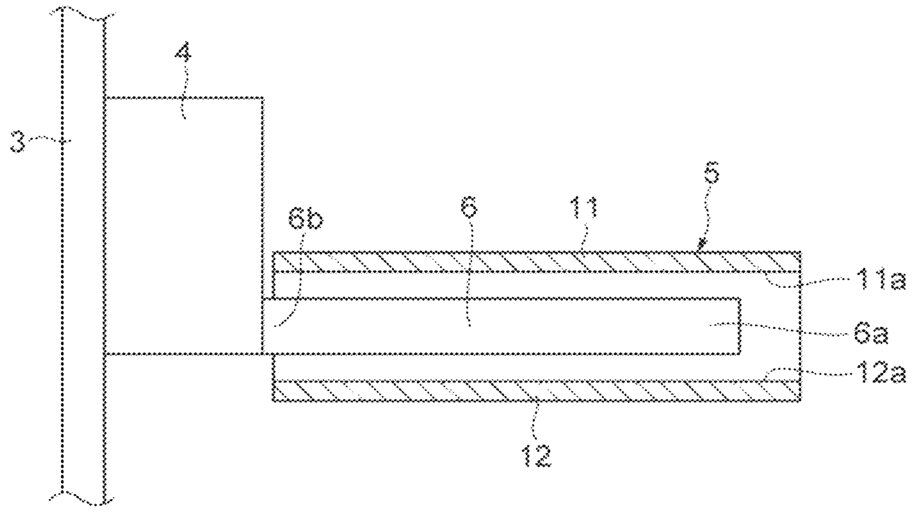
FIG. 8B is a cross-sectional view of the pallet in a posture that allows the fork to be pulled out of the pallet shown in FIG. 5.

When the upper sensor 21, the lower sensor 22, and the pallet sensor 23 respectively output OFF signal, OFF signal, and OFF signal, the distal portion 6*a* of the fork 6 is not adjacent to the inner wall surface 11*a* of the upper wall 11 of the pallet 5, the distal portion 6*a* of the fork 6 is not adjacent to the inner wall surface 12*a* of the lower wall 12 of the pallet 5, and the proximal portion 6*b* of the fork 6 is not in contact with the inner wall surface 11*a* of the upper wall 11 of the pallet 5, as illustrated in FIG. 8B. In this state, there is a clearance between the fork 6 and the pallet 5 (the upper wall 11 and the lower wall 12) along the whole length of the fork 6. Accordingly, the posture of the pallet 5 allows the fork 6 to be pulled out of the pallet 5.

When the upper sensor 21 and the lower sensor 22 respectively output ON signal and ON signal, the distal portion 6*a* of the fork 6 is adjacent to the inner wall surface 11*a* of the upper wall 11 of the pallet 5, and the distal portion 6*a* of the fork 6 is adjacent to the inner wall surface 12*a* of the lower wall 12 of the pallet 5. In this state, an abnormality is suspected to have occurred regardless of the detection signal from the pallet sensor 23. Accordingly, the posture of the pallet 5 is a posture that requires the fork 6 to immediately stop.

As illustrated in FIG. 4, the controller 30 judges whether the posture of the pallet 5 requires the fork 6 to immediately stop, based on the determination in step S103 (step S104). When the controller 30 judges that the posture of the pallet 5 does not require the fork 6 to immediately stop, the controller 30 judges whether the posture of the pallet 5 allows the fork 6 to be pulled out of the pallet 5 (step S105). That is, the controller 30 judges whether the fork 6 is allowed to be pulled out of the pallet 5.

When the controller 30 judges that the posture of the pallet 5 allows the fork 6 to be pulled out of the pallet 5, the controller 30 controls the cargo handling drive unit 27 so that the lift cylinder 7 stops lowering the fork 6 (step S106).

When the controller 30 judges that the posture of the pallet 5 does not allow the fork 6 to be pulled out of the pallet 5, the controller 30 controls the cargo handling drive unit 27 so that the lift cylinder 7 temporarily stops lowering the fork 6 (step S107). The controller 30 then judges whether the posture of the pallet 5 requires the fork 6 to tilt forward (step S108).

When the controller 30 judges that the posture of the pallet 5 requires the fork 6 to tilt forward, the controller 30 controls the cargo handling drive unit 27 so that the fork 6 tilts forward (step S109). Specifically, the controller 30 controls the cargo handling drive unit 27 so that the tilt cylinder 8 tilts the fork 6 forward by a predetermined angle.

The controller 30 controls the cargo handling drive unit 27 so that the lift cylinder 7 raises the fork 6 (step S110). Specifically, the controller 30 controls the cargo handling drive unit 27 so that the lift cylinder 7 slightly raises the fork 6 by a predetermined amount. Then, the controller 30 executes step S102 again.

When the controller 30 judges in step S108 that the posture of the pallet 5 does not require the fork 6 to tilt forward, the controller 30 judges whether the posture of the pallet 5 requires the fork 6 to tilt backward (step S111).

When the controller 30 judges that the posture of the pallet 5 requires the fork 6 to tilt backward, the controller 30 controls the cargo handling drive unit 27 so that the tilt cylinder 8 tilts the fork 6 backward (step S112). Specifically, the controller 30 controls the cargo handling drive unit 27 so that the tilt cylinder 8 tilts the fork 6 backward by a predetermined angle.

The controller 30 controls the cargo handling drive unit 27 so that the lift cylinder 7 lowers the fork 6 (step S113). Specifically, the controller 30 controls the cargo handling drive unit 27 so that the lift cylinder 7 slightly lowers the fork 6 by a predetermined amount. Then, the controller 30 executes step S102 again.

When the controller 30 judges in step S111 that the posture of the pallet 5 does not require the fork 6 to tilt backward, the controller 30 judges that the pallet is being lowered by the fork 6. Then, the controller 30 executes step S102 again.

When the controller 30 judges in step S104 that the posture of the pallet 5 requires the fork 6 to immediately stop, the controller 30 controls the alarm 28 so that the alarm 28 alerts (step S114). The controller 30 then controls the cargo handling drive unit 27 so that the lift cylinder 7 stops lowering the fork 6 (step S106).

Step S101 is executed by the fork lowering controller 31. Step S102 and step S103 are executed by the pallet posture determination unit 32. Step S104 to step S114 are executed by the pallet placement controller 33.

Figure 9:
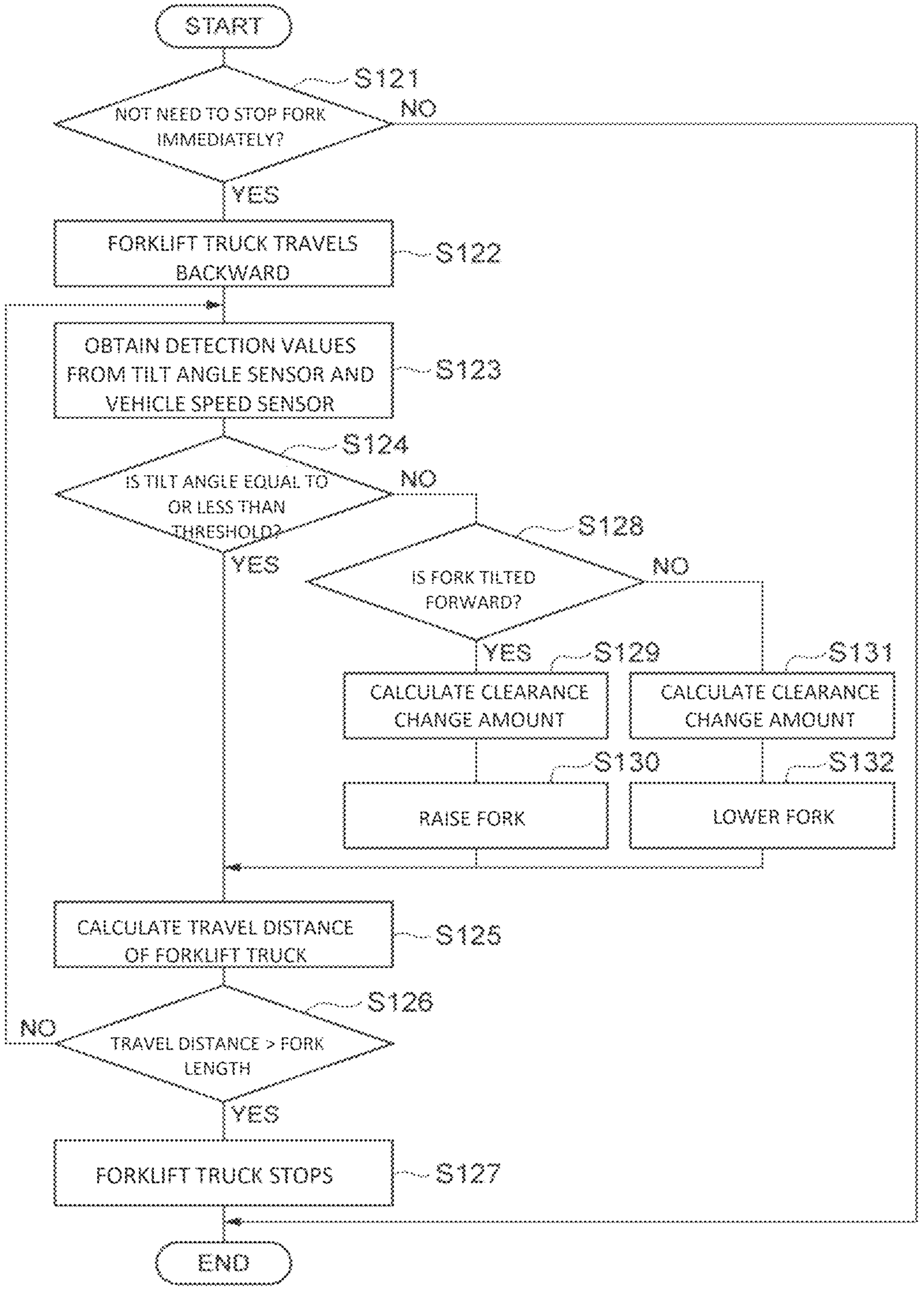
FIG. 9 is a flowchart of a fork withdrawal control process executed by the controller illustrated in FIG. 1.

FIG. 9 is a flowchart of a fork withdrawal control process executed by the controller 30. This process is executed by the withdrawal and travel controller 34 and the fork height controller 35 after the pallet 5 is placed on the loading surface 9*a* of the loading platform 9 in accordance with the process illustrated in FIG. 4.

As illustrated in FIG. 9, the controller 30 first judges whether the posture of the pallet 5 requires the fork 6 to immediately stop, based on the determination in step S103 (step S121). When the controller 30 judges that the posture of the pallet 5 requires the fork 6 to immediately stop, the controller 30 does not execute the fork withdrawal control process.

When the controller 30 judges that the posture of the pallet 5 does not require the fork 6 to immediately stop, the controller 30 controls the travelling drive unit 26 so that the forklift truck 2 travels backward (step S122). This initiates the withdrawal of the fork 6 from the pallet 5.

The controller 30 then obtains detection values detected by the tilt angle sensor 24 and the vehicle speed sensor 25 (step S123). The controller 30 judges whether the tilt angle of the fork 6 is equal to or less than a predetermined threshold based on the detection value of the tilt angle sensor 24 (step S124). The threshold is set to an angle that allows the fork 6 to be pulled out of the pallet 5.

When the controller 30 judges that the tilt angle of the fork 6 is equal to or less than the threshold, the controller 30 calculates the travel distance of the forklift truck 2 from the start of the withdrawal of the fork 6 from the pallet 5 based on the detection value of the vehicle speed sensor 25 (step S125). Specifically, the controller 30 calculates the travel distance of the forklift truck 2 by multiplying the travel speed of the forklift truck 2 by a travel time.

The controller 30 then judges whether the travel distance of the forklift truck 2 from the start of the withdrawal of the fork 6 is greater than a fork length L of the fork 6 (see FIG. 3) (step S126). The fork length L is the dimension of an insertion part of the fork 6 inserted into the pallet hole 10 of the pallet 5. Specifically, the fork length L is the dimension of the fork 6 from the proximal end to the distal end of fork 6.

When the controller 30 judges that the travel distance of the forklift truck 2 from the start of the withdrawal of the fork 6 is equal to or less than the fork length L of the fork 6, the controller 30 executes step S123 again.

When the controller 30 judges that the travel distance of the forklift truck 2 from the start of the withdrawal of the fork 6 is equal to or greater than the fork length L of the fork 6, the controller 30 controls the travelling drive unit 26 so that the forklift truck 2 stops travelling backward (step S127). This completes the placement of the pallet 5.

When the controller 30 judges based on the detection value of the tilt angle sensor 24 in step S124 that the tilt angle of the fork 6 is greater than the predetermined threshold, the controller 30 judges whether the fork 6 is tilted forward (step S128).

When the controller 30 judges that the fork 6 is tilted forward, the controller 30 calculates the amount of change in the clearance between the pallet and the fork 6 based on the detection values of the tilt angle sensor 24 and the vehicle speed sensor 25 (step S129).

Figure 10A:
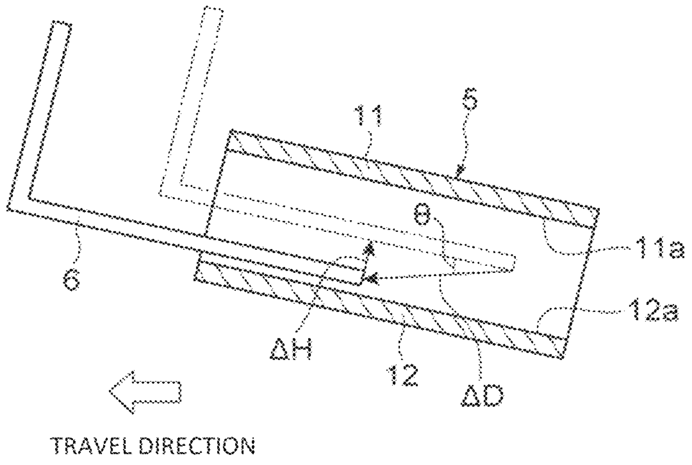
FIG. 10A and FIG. 10B are cross-sectional views of the pallet, illustrating an example of a clearance change amount between the pallet and the fork when the fork is pulled out of the pallet.

Specifically, the controller 30 calculates the amount of change in the clearance (i.e., clearance change amount AH) between the pallet 5 and the fork 6 using the following formula (A). As illustrated in FIG. 10A, the tilt angle of the fork 6 is denoted by θ, and the reverse distance of the forklift truck 2 is denoted by AD. When the fork 6 is tilted forward, the clearance change amount AH in the clearance between pallet 5 and the fork 6 is the amount of change in the clearance between the lower wall 12 of the pallet 5 and the fork 6. The reverse distance of the forklift truck 2 is calculated in the manner in step S125.

$$\Delta H = \Delta D * \sin\theta \tag{A}$$

The controller 30 then controls the cargo handling drive unit 27 so that the fork 6 is raised (step S130). Specifically, the controller 30 calculates the raise amount of the fork 6 based on the clearance change amount between the pallet 5 and the fork 6 such that the clearance between the pallet 5 and the fork 6 becomes constant, and controls the cargo handling drive unit 27 so that the fork 6 is raised according to the calculated raise amount of the fork 6. Then, the controller 30 executes step S125.

Figure 10B:
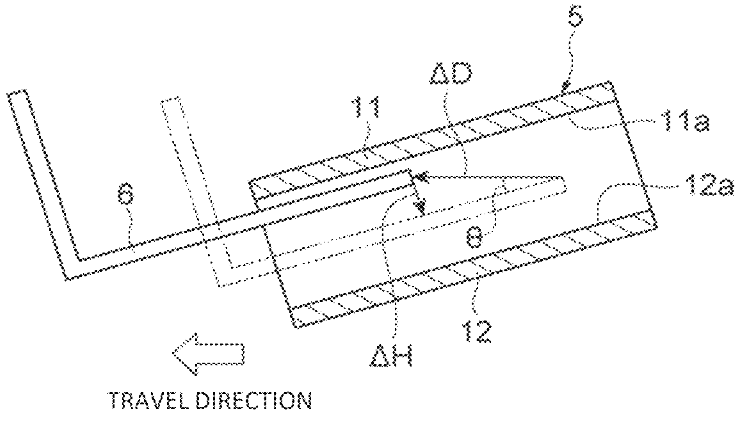

When the controller 30 judges in step S128 that the fork 6 is tilted backward, the controller 30 calculates the clearance change amount between the pallet 5 and the fork 6 based on the detection values of the tilt angle sensor 24 and the vehicle speed sensor 25 (step S131). Specifically, the controller 30 calculates the clearance change amount ΔH between the pallet 5 and the fork 6 using the formula (A). As illustrated in FIG. 10B, the tilt angle of the fork 6 is denoted by θ, and the reverse distance of the forklift truck 2 is denoted by AD. When the fork 6 is backward, the clearance change amount ΔH in the clearance between pallet 5 and the fork 6 is the amount of change in the clearance between the upper wall 11 of the pallet 5 and the fork 6.

The controller 30 then controls the cargo handling drive unit 27 so that the fork 6 is lowered (step S132). Specifically, the controller 30 calculates the lowering amount of the fork 6 based on the clearance change amount between the pallet 5 and the fork 6 such that the clearance between the pallet 5 and the fork 6 becomes constant, and controls the cargo handling drive unit 27 so that the fork 6 is lowered according to the calculated lowering amount of the fork 6. Then, the controller 30 executes step S125.

Step S121, step S122, and steps S125 to S127 are executed by the withdrawal and travel controller 34. Step S123, step S124, and steps S128 to S132 are executed by the fork height controller 35.

The forklift truck 2 may load the pallet 5 onto a horizontal surface that serves as the loading surface 9*a*, as illustrated in FIG. 11A. In this case, first, the lift cylinder 7 lowers the fork 6 holding the pallet 5 toward the loading platform 9. In this state, the upper sensor 21, the lower sensor 22, and the pallet sensor 23 respectively output ON signal, OFF signal, and ON signal. Accordingly, the pallet 5 is being lowered by the fork 6 (see FIG. 6A).

Figure 11B:
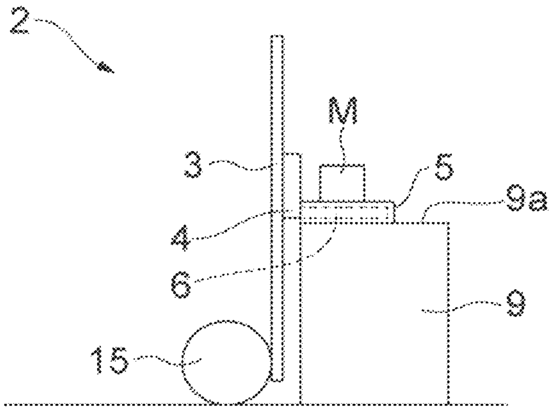

As illustrated in FIG. 11B, the pallet 5 comes into contact with the loading surface 9*a* of the loading platform 9. A bottom surface 5*a* of the pallet 5 is parallel to the loading surface 9*a* of the loading platform 9. Accordingly, the pallet 5 does not tilt relative to the fork 6 when the pallet 5 comes into contact with the loading surface 9*a*.

The fork 6 is still lowered after the pallet 5 comes into contact with loading surface 9*a*. In this state, the upper sensor 21, the lower sensor 22, and the pallet sensor 23 respectively output OFF signal, OFF signal, and OFF signal. Accordingly, the posture of the pallet 5 allows the fork 6 to be pulled out of the pallet 5 (see FIG. 8B).

Figure 11C:
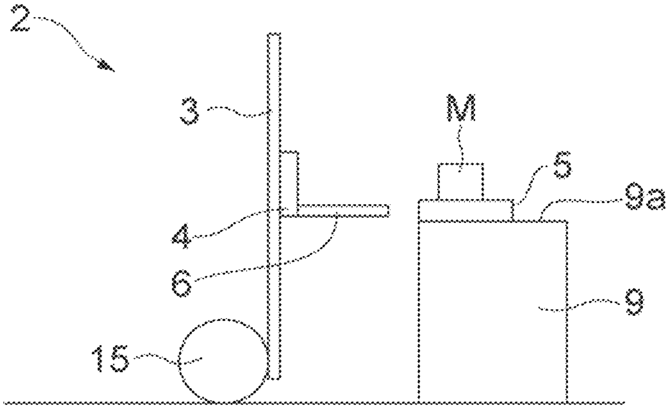

The lift cylinder 7 stops lowering the fork 6. The forklift truck 2 travels backward to pull the fork 6 out of the pallet 5 as illustrated in FIG. 11C. This completes the placement of the pallet 5.

Figure 12A:
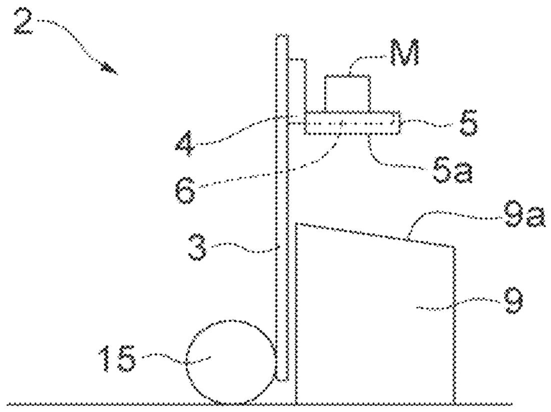
FIGS. 12A to 12C are side views of the forklift truck and the pallet, illustrating operations of the forklift truck for placing the pallet on a loading surface that slopes downward away from the forklift truck side.

The forklift truck 2 may load the pallet 5 onto a surface that serves as the loading surface 9*a* and slopes downward away from the forklift truck 2 side, as illustrated in FIG. 12A. In this case, first, the lift cylinder 7 lowers the fork 6 holding the pallet 5 toward the loading platform 9. The pallet 5 comes into contact with the loading surface 9*a* of the loading platform 9.

Figure 12B:
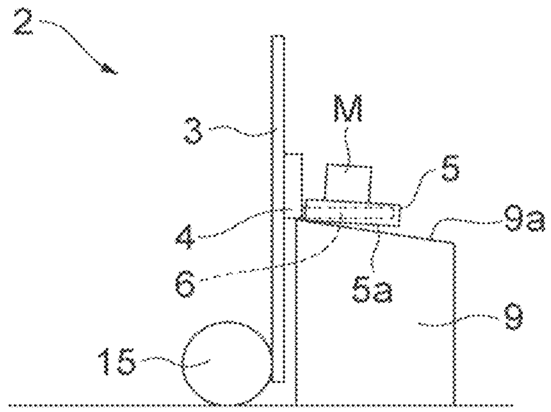

Specifically, as illustrated in FIG. 12B, the pallet 5 comes into contact, at the end of the bottom surface 5*a* near the forklift truck 2, with the loading surface 9*a* that slopes downward from the forklift truck 2 side. Accordingly, the pallet 5 tilts downward along the sloping loading surface 9*a*. In this state, the upper sensor 21, the lower sensor 22, and the pallet sensor 23 respectively output ON signal, OFF signal, and OFF signal. Accordingly, the posture of the pallet 5 requires the fork 6 to tilt forward (see FIG. 6B).

Figure 12C:
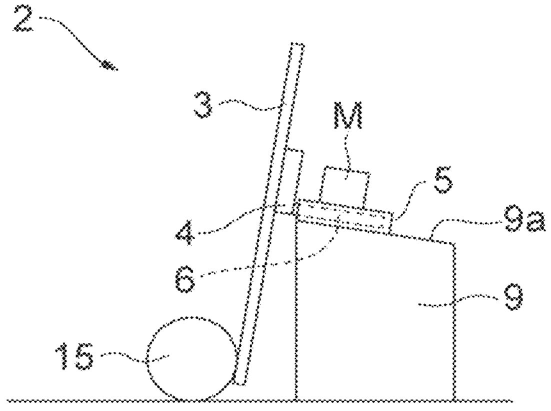

The lift cylinder 7 stops lowering the fork 6. As illustrated in FIG. 12C, the forklift truck 2 places the pallet 5 on the loading surface 9*a*. Specifically, the tilt cylinder 8 tilts the fork 6 forward so that the fork 6 approaches and becomes parallel to the inner wall surface 12*a* of the lower wall 12 of the pallet 5, and the lift cylinder 7 slightly raises the fork 6 so that the fork 6 does not come into contact with the inner wall surface 12*a* of the lower wall 12 of the pallet 5.

In this state, the upper sensor 21, the lower sensor 22, and the pallet sensor 23 respectively output OFF signal, OFF signal, and OFF signal. Accordingly, the posture of the pallet 5 allows the fork 6 to be pulled out of the pallet 5 (see FIG. 8B).

The forklift truck 2 travels backward to pull the fork 6 out of the pallet 5. While the fork 6 is pulled out, the fork 6 is raised so that the fork 6 does not come into contact with the inner wall surface 12*a* of the lower wall 12 of the pallet 5. This prevents the fork 6 from getting caught on the lower wall 12 of the pallet 5, when the fork 6 is pulled out of the pallet 5.

Figure 13A:
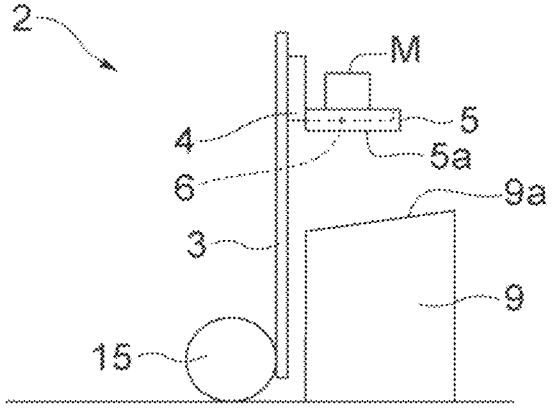
FIGS. 13A to 13C are side views of the forklift truck and the pallet, illustrating operations of the forklift truck for placing the pallet on a loading surface that slopes upward away from the forklift truck side.

The forklift truck 2 may load the pallet 5 onto a surface that serves as the loading surface 9*a* and slopes upward away from the forklift truck 2 side, as illustrated in FIG. 13A. In this case, first, the lift cylinder 7 lowers the fork 6 holding the pallet 5 toward the loading platform 9. The pallet 5 comes into contact with the loading surface 9*a* of the loading platform 9.

Figure 13B:
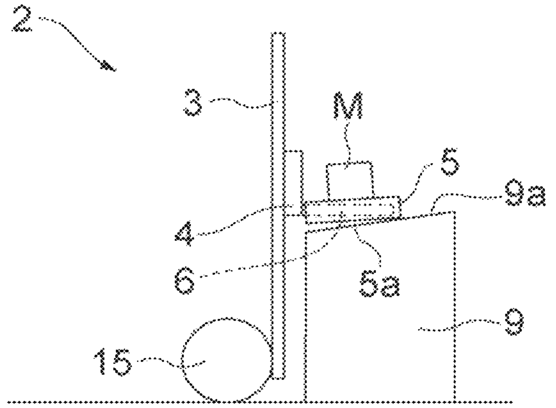

Specifically, as illustrated in FIG. 13B, the pallet 5 comes into contact, at the end of the bottom surface 5*a* farthest from the forklift truck 2, with the loading surface 9*a* that slopes upward from the forklift truck 2 side. Accordingly, the pallet tilts upward along the sloping loading surface 9*a*. In this state, the upper sensor 21, the lower sensor 22, and the pallet sensor 23 respectively output OFF signal, ON signal, and ON signal. Accordingly, the posture of the pallet 5 requires the fork 6 to tilt backward (see FIG. 7A).

Figure 13C:
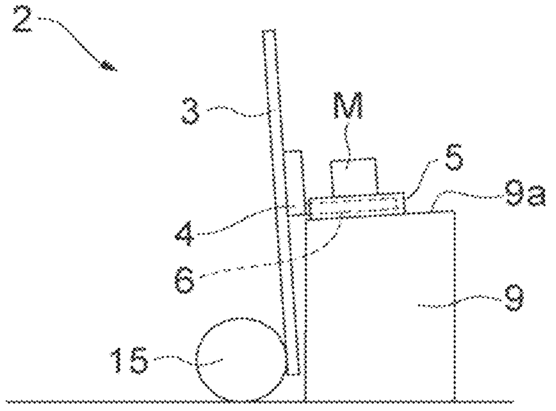

The lift cylinder 7 stops lowering the fork 6. As illustrated in FIG. 13C, the forklift truck 2 places the pallet 5 on the loading surface 9*a*. Specifically, the tilt cylinder 8 tilts the fork 6 backward so that the fork 6 approaches and becomes parallel to the inner wall surface 11*a* of the upper wall 11 of the pallet 5, and the lift cylinder 7 slightly lowers the fork 6 so that the fork 6 does not come into contact with the inner wall surface 11*a* of the upper wall 11 of the pallet 5.

In this state, the upper sensor 21, the lower sensor 22, and the pallet sensor 23 respectively output OFF signal, OFF signal, and OFF signal. Accordingly, the posture of the pallet 5 allows the fork 6 to be pulled out of the pallet 5 (see FIG. 8B).

The forklift truck 2 travels backward to pull the fork 6 out of the pallet 5. While the fork 6 is pulled out, the fork 6 is lowered so that the fork 6 does not come into contact with the inner wall surface 11*a* of the upper wall 11 of the pallet 5. This prevents the fork 6 from getting caught on the upper wall 11 of the pallet 5, when the fork 6 is pulled out of the pallet 5.

According to the present embodiment, firstly, the controller 30 starts controlling the lift cylinder 7 so that the lift cylinder 7 lowers the fork 6 holding the pallet 5 toward the loading surface 9*a* of the loading platform 9. After the controller 30 starts controlling the lift cylinder 70, the upper sensor 21 detects whether the distal portion 6*a* of the fork 6 is adjacent to the upper wall 11 of the pallet 5, the lower sensor 22 detects whether the distal portion 6*a* of the fork 6 is adjacent to the lower wall 12 of the pallet 5, and the pallet sensor 23 detects whether the proximal portion 6*b* of the fork 6 is in contact with the upper wall 11 of the pallet 5. The controller 30 determines a posture of the pallet 5 relative to the fork 6 based on the detection signals from the upper sensor 21, the lower sensor 22, and the pallet sensor 23. The controller 30 controls the lift cylinder 7 and tilt cylinder 8 so that the fork 6 is placed on the loading surface 9*a* of the loading platform 9 depending on the posture of the pallet 5 relative to the fork 6. The posture of pallet 5 relative to fork 6 changes depending on whether the pallet 5 is tilted. The controller 30 judges whether the posture of the pallet 5 relative to the fork 6 allows the fork 6 to be pulled out of the pallet 5. When the controller 30 judges that the fork 6 is allowed to be pulled out of the pallet 5, the controller 30 controls the lift cylinder 7 so that the lift cylinder 7 stops lowering the fork 6. When the controller 30 judges that the fork 6 is not allowed to be pulled out of the pallet 5, the controller 30 controls the tilt cylinder 8 so that the tilt cylinder 8 tilts the fork 6 along the loading surface 9*a* of the loading platform 9. This eliminates the need for tilting the fork 6 when the controller 30 judges that the posture of the pallet 5 relative to the fork 6 allows the fork 6 to be pulled out of the pallet 5. This also eliminates the need for tilting the fork 6 backward after tilting the fork 6 forward and simply needs to tilt the fork 6 along the loading surface 9*a* when the controller judges that the fork 6 is not allowed to be pulled out of the pallet 5. This therefore reduces the time to place the pallet 5.

According to the present embodiment, when the upper sensor 21 detects that the distal portion 6*a* of the fork 6 is not adjacent to the upper wall 11 of the pallet 5 and the pallet sensor 23 detects that the proximal portion 6*b* of the fork 6 is not in contact with the upper wall 11 of the pallet 5, the controller 30 judges that the posture of the pallet 5 allows the fork 6 to be pulled out of the pallet 5. This facilitates the judgement of whether the posture of the pallet 5 allows the fork 6 to be pulled out of the pallet 5 based on the detection signals from the upper sensor 21 and the pallet sensor 23. This therefore simplifies the placement of pallet 5.

According to the present embodiment, when the upper sensor 21 detects that the distal portion 6*a* of the fork 6 is adjacent to the upper wall 11 of the pallet 5, the lower sensor 22 detects that the distal portion 6*a* of the fork 6 is not adjacent to the lower wall 12 of the pallet 5, and the pallet sensor 23 detects that the proximal portion 6*b* of the fork 6 is not in contact with the upper wall 11 of the pallet 5, the controller 30 determines that the posture of the pallet 5 is a posture that requires the fork 6 to tilt forward. When the upper sensor 21 detects that the distal portion 6*a* of the fork 6 is not adjacent to the upper wall 11 of the pallet 5, the lower sensor 22 detects that the distal portion 6*a* of the fork 6 is adjacent to the lower wall 12 of the pallet 5, and the pallet sensor 23 detects that the proximal portion 6*b* of the fork 6 is in contact with the upper wall 11 of the pallet 5, the controller 30 determines that the posture of the pallet 5 is a posture that requires the fork 6 to tilt backward. This facilitates the judgement of whether the posture of the pallet 5 requires the fork 6 to tilt forward or whether the posture of the pallet 5 requires the fork 6 to tilt backward based on the detection signals from the upper sensor 21, the lower sensor 22, and the pallet sensor 23. This further simplifies the placement of pallet 5.

According to the present embodiment, when the controller 30 determines that the posture of the pallet 5 requires the fork 6 to tilt forward, the controller 30 controls the tilt cylinder 8 so that the tilt cylinder 8 tilts the fork 6 forward incrementally by a certain amount until the controller 30 determines that the posture of the pallet 5 does not require the fork 6 to tilt forward. When the controller 30 determines that the posture of the pallet 5 requires the fork 6 to tilt backward, the controller 30 controls the tilt cylinder 8 so that the tilt cylinder 8 tilts the fork 6 backward incrementally by a certain amount until the controller 30 determines that the posture of the pallet 5 does not require the fork 6 to tilt backward. Accordingly, the fork 6 gradually tilts forward when the posture of the pallet 5 requires the fork 6 to tilt forward, and gradually tilts backward when the posture of the pallet 5 requires the fork 6 to tilt backward. This allows the fork 6 to tilt smoothly, regardless of the tilt angle of the pallet 5.

According to the present embodiment, when the upper sensor 21 detects that the distal portion 6*a* of the fork 6 is adjacent to the upper wall 11 of the pallet and the lower sensor 22 detects that the distal portion 6*a* of the fork 6 is adjacent to the lower wall 12 of the pallet 5, the controller 30 determines that the posture of the pallet 5 is a posture that requires the fork 6 to immediately stop. This facilitates the judgement of whether the posture of the pallet 5 requires the fork 6 to immediately stop based on the detection signals from the upper sensor 21 and the lower sensor 22. This therefore allows immediate stop of the placement of the pallet 5 if an abnormality occurs in the forklift truck 2, for example.

The present disclosure is not limited to the above-described embodiment. For example, according to the above-described embodiment, the fork 6 is slightly raised to tilt forward to place the pallet 5 on the loading surface 9*a* of the loading platform 9, and slightly lowered to tilt backward to place the pallet 5 on the loading surface 9*a* of the loading platform 9. However, the present disclosure is not limited thereto. When tilting the fork 6 forward, it is not necessary to raise the fork 6 if the fork 6 does not come into contact with the lower wall 12 of the pallet 5. When tilting the fork 6 backward, it is not necessary to lower the fork 6 if the fork 6 does not come into contact with the upper wall 11 of the pallet 5.

According to the above-described embodiment, the controller 30 calculates the travel distance of the forklift truck 2 by multiplying the travel speed of the forklift truck 2 by a travel time. However, a sensor, such as an odometry sensor, may detect the travel distance of the forklift truck 2.

According to the above-described embodiment, a counterbalance forklift truck serves as the forklift truck 2. However, the present disclosure is applicable to a reach forklift truck. In this case, the reach forklift truck may retract the mast 3 using a reach cylinder to pull the fork 6 out of the pallet 5.

What is claimed is:

1. A cargo handling control device of a forklift truck, the forklift truck including a lift cylinder configured to raise and lower a fork holding a pallet and a tilt cylinder configured to tilt the fork, the cargo handling control device comprising:

a first detector configured to detect whether a distal portion of the fork inserted into a pallet hole of the pallet is adjacent to an upper wall of the pallet, the first detector being configured to output a detection signal;

a second detector configured to detect whether the distal portion of the fork inserted into the pallet hole of the pallet is adjacent to a lower wall of the pallet, the second detector being configured to output a detection signal;

a third detector configured to detect whether a proximal portion of the fork inserted into the pallet hole of the pallet is in contact with the upper wall of the pallet, the third detector being configured to output a detection signal;

a fork lowering controller configured to control the lift cylinder so that the lift cylinder lowers the fork holding the pallet toward a loading surface;

a pallet posture determination unit configured to determine a posture of the pallet relative to the fork based on the detection signals from the first detector, the second detector, and the third detector, after the fork lowering controller starts controlling the lift cylinder;

a pallet placement controller configured to control the lift cylinder and the tilt cylinder so that the fork is placed on the loading surface depending on the posture of the pallet relative to the fork determined by the pallet posture determination unit; and a fork withdrawal controller configured to control the forklift truck so that the forklift truck pulls the fork out of the pallet after the pallet placement controller completes controlling the lift cylinder and the tilt cylinder, wherein the pallet placement controller judges based on the posture of the pallet whether the fork is allowed to be pulled out of the pallet, when the pallet placement controller judges that the fork is allowed to be pulled out of the pallet, the pallet placement controller controls the lift cylinder so that the lift cylinder stops lowering the fork, and when the pallet placement controller judges that the fork is not allowed to be pulled out of the pallet, the pallet placement controller controls the tilt cylinder so that tilt cylinder tilts the fork along the loading surface.

2. The cargo handling control device according to claim 1, wherein the pallet posture determination unit determines that the posture of the pallet is a posture that allows the fork to be pulled out of the pallet, when the first detector detects that the distal portion of the fork is not adjacent to the upper wall of the pallet and the third detector detects that the proximal portion of the fork is not in contact with the upper wall of the pallet, and when the pallet posture determination unit determines that the posture of the pallet is a posture that allows the fork to be pulled out of the pallet, the pallet placement controller controls the lift cylinder so that the lift cylinder stops lowering the fork.

3. The cargo handling control device according to claim 1, wherein the pallet posture determination unit determines that:

the posture of the pallet is a posture that requires the fork to tilt forward, when the first detector detects that the distal portion of the fork is adjacent to the upper wall of the pallet, the second detector detects that the distal portion of the fork is not adjacent to the lower wall of the pallet, and the third detector detects that the proximal portion of the fork is not in contact with the upper wall of the pallet; and, the posture of the pallet is a posture that requires the fork to tilt backward, when the first detector detects that the distal portion of the fork is not adjacent to the upper wall of the pallet, the second detector detects that the distal portion of the fork is adjacent to the lower wall of the pallet, and the third detector detects that the proximal portion of the fork is in contact with the upper wall of the pallet, when the pallet posture determination unit determines that the posture of the pallet is a posture that requires the fork to tilt forward, the pallet placement controller controls the tilt cylinder so that the tilt cylinder tilts the fork forward along the loading surface, and when the pallet posture determination unit determines that the posture of the pallet is a posture that requires the fork to tilt backward, the pallet placement controller controls the tilt cylinder so that the tilt cylinder tilts the fork backward along the loading surface.

4. The cargo handling control device according to claim 3, wherein when the pallet posture determination unit determines that the posture of the pallet is a posture that requires the fork to tilt forward, the pallet placement controller controls the tilt cylinder so that the tilt cylinder tilts the fork forward incrementally by a certain amount until the pallet posture determination unit determines that the posture of the pallet does not require the fork to tilt forward, and when the pallet posture determination unit determines that the posture of the pallet is a posture that requires the fork to tilt backward, the pallet placement controller controls the tilt cylinder so that the tilt cylinder tilts the fork backward incrementally by a certain amount until the pallet posture determination unit determines that the posture of the pallet does not require the fork to tilt backward.

5. The cargo handling control device according to claim 1, wherein the pallet posture determination unit determines that the posture of the pallet is a posture that requires the fork to immediately stop, when the first detector detects that the distal portion of the fork is adjacent to the upper wall of the pallet and the second detector detects that the distal portion of the fork is adjacent to the lower wall of the pallet, and when the pallet posture determination unit determines that the posture of the pallet is a posture that requires the fork to immediately stop, the pallet placement controller controls the forklift truck so that an operation of the forklift truck stops.

* * * * *